US008388203B2

(12) United States Patent
Albou

(10) Patent No.: US 8,388,203 B2
(45) Date of Patent: Mar. 5, 2013

(54) LIGHTING MODULE PERFECTED FOR MOTOR VEHICLE

(75) Inventor: Pierre Albou, Paris (FR)

(73) Assignee: Valeo Vision, Bobigny (FR)

(*) Notice: Subject to any disclaimer, the term of this patent is extended or adjusted under 35 U.S.C. 154(b) by 41 days.

(21) Appl. No.: 12/815,448

(22) Filed: Jun. 15, 2010

(65) Prior Publication Data

US 2011/0305034 A1 Dec. 15, 2011

(51) Int. Cl.
*B60Q 1/00* (2006.01)
*F21V 7/00* (2006.01)
*F21V 11/00* (2006.01)

(52) U.S. Cl. ........................................ 362/539; 362/518

(58) Field of Classification Search .................. 362/539, 362/518
See application file for complete search history.

(56) References Cited

U.S. PATENT DOCUMENTS

| | | | | |
|---|---|---|---|---|
| 6,997,587 | B2 * | 2/2006 | Albou | 362/516 |
| 7,524,094 | B2 * | 4/2009 | Fukawa et al. | 362/514 |
| 7,682,057 | B2 | 3/2010 | Albou | |
| 7,690,818 | B2 * | 4/2010 | Takada et al. | 362/299 |
| 7,789,545 | B2 * | 9/2010 | Cheng et al. | 362/539 |
| 7,993,043 | B2 * | 8/2011 | Sazuka et al. | 362/509 |
| 2006/0002130 | A1 * | 1/2006 | Albou | 362/514 |
| 2008/0025036 | A1 | 1/2008 | Takada et al. | |

FOREIGN PATENT DOCUMENTS

| | | | |
|---|---|---|---|
| EP | 1610057 | A1 | 12/2005 |
| EP | 1884708 | A1 | 2/2008 |
| FR | 2898662 | A1 | 9/2007 |

* cited by examiner

*Primary Examiner* — David J Makiya
(74) *Attorney, Agent, or Firm* — Jacox, Meckstroth & Jenkins

(57) ABSTRACT

A lighting module giving a cut light beam, including a concave reflector, at least one light source (S) arranged in the concavity of the reflector, and a lens situated in front of the reflector which is associated with a bender, the top side of which is reflecting. The bender has an edge of front end such as to form the cut in the light beam; the front edge of the bender is formed by a flat curve of variable curvature, the curve in a point (M) being a continuous function of the lateral coordinate (x) of this point. The reflector is determined to transform the wave surface originating from the source into a wave surface leading to the curve of variable curvature of the edge of the bender, and lens is determined to give an image to infinite from point (M) of edge of the bender.

18 Claims, 3 Drawing Sheets

FIG.3
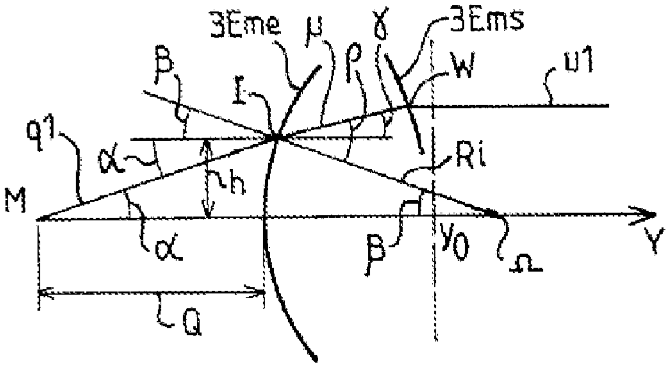
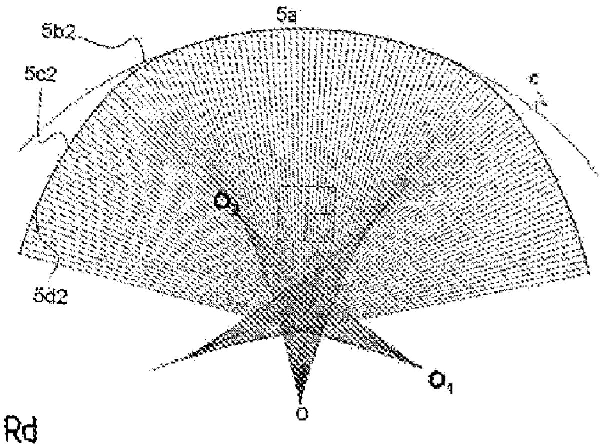
FIG.4
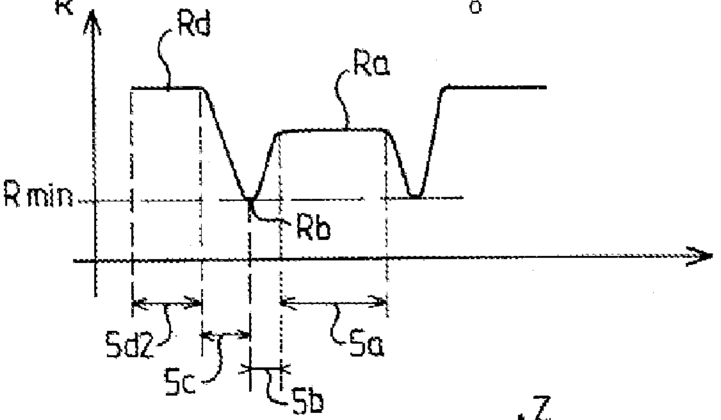
FIG.5
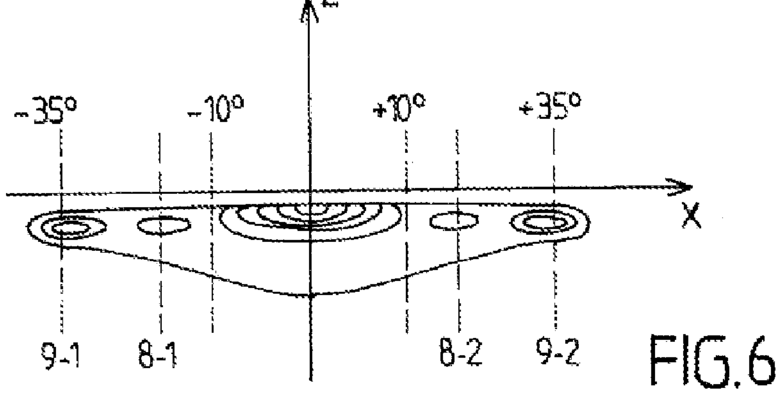
FIG.6

LIGHTING MODULE PERFECTED FOR MOTOR VEHICLE

CROSS-REFERENCE TO RELATED APPLICATIONS

This application is related to French Application No. 0807296 filed Dec. 19, 2009, which application is incorporated herein by reference and made a part hereof.

BACKGROUND OF THE INVENTION

1. Field of the Invention

The invention concerns a lighting module for a motor vehicle headlight, giving a cut light beam, of the kind that includes a concave reflector, at least one light source arranged in the concavity of the reflector, particularly to shed light at least upwards, and a lens situated in front of the reflector and the light source, the reflector being associated with a bender, particularly horizontal, the top side of which reflects to bend the beam originating from the reflector, the bender having a front end edge such as to form the cut in the light beam.

2. Description of the Related Art

The term "bender" designates a perceptibly flat and reflecting plate.

A lighting module is known, of the kind previously defined, of the patent EP-A-1 610 057, which was also published as U.S. Pat. No. 7,682,057. Such a module makes it possible to obtain a very wide light beam with a clean cut over the whole width of the beam. This kind of module is very suitable for lighting systems that combine several modules with optical axes and different curvatures. A fog-lamp generally uses two or three of these modules to give a light beam with a satisfactory division of the brightness over the whole angular extent of the beam, particularly towards the angular limits of the beam.

However, it is desirable to reduce the number of modules to be used to obtain a satisfactory beam, particularly in fog.

The invention particularly serves to offer a module of the kind defined previously, which makes it possible to obtain a beam in which the division of light is improved in order to enhance the brightness of the angular end zones, particularly those situated at about ±35° on both sides of the optical axis, without reducing the brightness of the central zone situated perceptibly between +10° and −10° on both sides of the optical axis.

SUMMARY OF THE INVENTION

The invention likewise serves to provide a sufficiently improved lighting module to alone constitute a fog-lamp that satisfies the imposed requirements.

According to the invention, a lighting module of the kind defined above is such that the front edge of the bender is formed by a flat to variable curve, the curvature at one point being a continuous function of the distance from this point to the optical axis, or lateral coordinate of this point,

- the reflector is determined in order to transform the wave surface originating from the source into a wave surface leading to the curve with variable curvature from the front edge of the bender,
- and in that the lens is determined to give an image to infinite from one point (particularly any point) from the front edge of the bender, for all the radii contained in the perpendicular level at the front edge of the bender at the point considered, particularly in a direction that slopes in relation to the level of the bender from an angle of continuous function of the distance from this point to the optical axis (or lateral coordinate of this point).

The curvature of the front edge of the bender presents, particularly, at least one maximum situated at an angle between the optical axis of the module and an angular limit of the beam. Preferably, the curve of the front edge of the bender presents a maximum from each side of the optical axis. Habitually, the front edge of the bender is symmetrical in relation to this optical axis.

Preferably, the curvature of the front edge of the bender presents a secondary maximum situated on or substantially on the optical axis.

Generally, the wave surface coming from the source is similar to a spherical wave surface.

The maximum curvature of the front edge of the bender is chosen so that the brightness of the angular end zones of the beam, particularly following directions equal to or in excess of ±35° on both sides of the optical axis, is reinforced, without decreasing the brightness of the central zone.

The surface of the reflector is such that the luminous radii coming from the source and falling in points situated on the intersection of this surface and a normal vertical level at the front edge of the bender, but away from the source, are reflected in this vertical level so as to converge in a point situated at the intersection of the vertical level and the edge of the bender.

Advantageously, the lighting module is arranged so that the brightness in the central zone between −10° and +10° on both sides of the optical axis is maintained in relation to a base module, the bender of which would have a circular front edge, with radius equal to the average radius of curvature of the front edge, while the zones situated at about −35° and +35° on both sides of the optical axis, corresponding to lines recorded as 9-1 and 9-2 according to the standard R19-3 , present a brightness higher than that obtained with the base module.

Advantageously, the cut beam obtained is of flat cut, being particularly chosen between a fog beam and a portion of low beam of flat cut.

The invention likewise has as its object a lighting module for a motor vehicle headlight, giving a cut light beam, including a concave reflector, at least one light source arranged particularly in the concavity of the reflector to light, particularly at least upwards, and a lens situated in front of the reflector and the light source, the reflector being associated with a bender, particularly horizontal, the top side of which reflects to bend the beam originating from the reflector, the bender having a front end edge such as to form the cut in the light beam, featuring the fact that:

- the front edge of the bender is formed by a flat curve, particularly in a horizontal level with variable curvature, this curve being particularly different from a circle or a straight line, the curvature at one point being a continuous function (without leap of curve) of the lateral coordinate of this point,
- the reflector presents a shape chosen so that a radius coming from the center of the light source and reflected by the reflector cuts the front edge of the bender, being contained within a normal level at this edge, passing by this point of intersection,
- and the lens is arranged to give an image to infinite, from a point of the edge of the bender, in the level perpendicular to the front edge, from the bender to the point of intersection.

The invention likewise concerns a headlight including at least one module as defined previously.

The invention consists, apart from the provisions set out above, of a certain number of other provisions which will be more explicitly addressed below, concerning an example of realization described with reference to the attached drawings, but which is not in any way limiting.

These and other objects and advantages of the invention will be apparent from the following description, the accompanying drawings and the appended claims.

BRIEF DESCRIPTION OF THE ACCOMPANYING DRAWINGS

On these drawings:

FIG. 3 is a diagram of a partial section of the lens according to the previous figures for the calculation;

FIG. 4 is a diagrammatic view from above, at larger scale, of the front edge of the bender of the module according to the previous figures;

FIG. 5 is a diagram representing the variation of the radius of curvature of the bender of the module according to the previous figures with, in x-axis, the lateral distance to the optical axis, and in y-axis the radius of curvature in a point of the curve;

FIG. 6 is a diagram of the light distribution, on a screen, of the beam produced by the module of the module according to the previous figures of the invention.

DETAILED DESCRIPTION OF THE PREFERRED EMBODIMENTS

Figure 1:
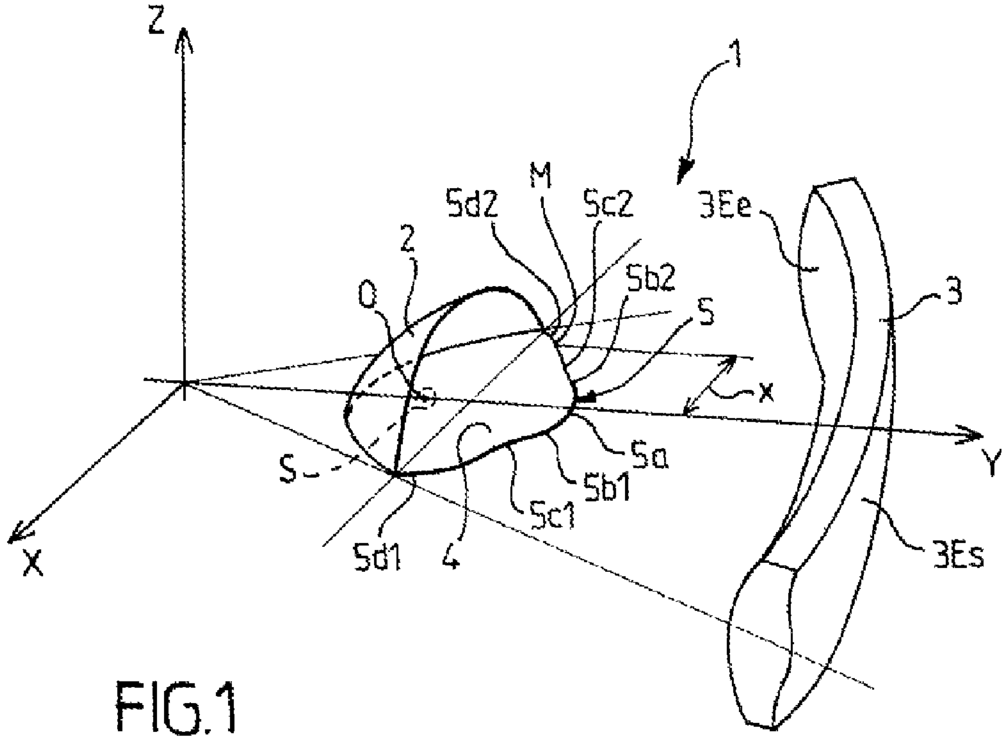
FIG. 1 is a diagrammatic, simplified perspective view of a module according to a first variant of the invention.

Referring to FIG. 1 of the drawings, one can see a lighting module 1 for a motor vehicle headlight, represented in diagram form, this module being such as to give a cut light beam. Module 1 includes one concave reflector 2, at least one light source S arranged in the concavity of the reflector to light at least upwards, and one lens 3 situated in front of source S and reflector 2, according to the direction of propagation of the light beam. Reflector 2 is associated with a bender 4, consisting of a flat reflecting plate, horizontal as represented in FIG. 1. Folder 4, of which at least the top side is reflecting, includes a front end edge 5 such as to form the cut in the light beam. When bender 4 is horizontal, the cut of the beam is horizontal and the lit zone is situated below a horizontal line. By inclining the level of bender 4 around the horizontal optical axis of the module, one can incline the line of cut of the beam.

Light source S is advantageously, perceptibly isolated, particularly formed by an electroluminescent diode enveloped by a globe or hemispherical capsule, this diode presenting an axis of light diffusion which is perceptibly orthogonal to bender 4, and lighting upwards.

According to the invention, in order to transfer into the beam of light towards the external angular zones from intermediary angular zones, without penalizing the central zone, one shapes front edge 5 of the bender as a flat curve with variable curvature, the curvature of which at one point is a continuous function of the distance x, or lateral coordinate, from this point to the optical axis Y, for the point considered.

Figure 2:
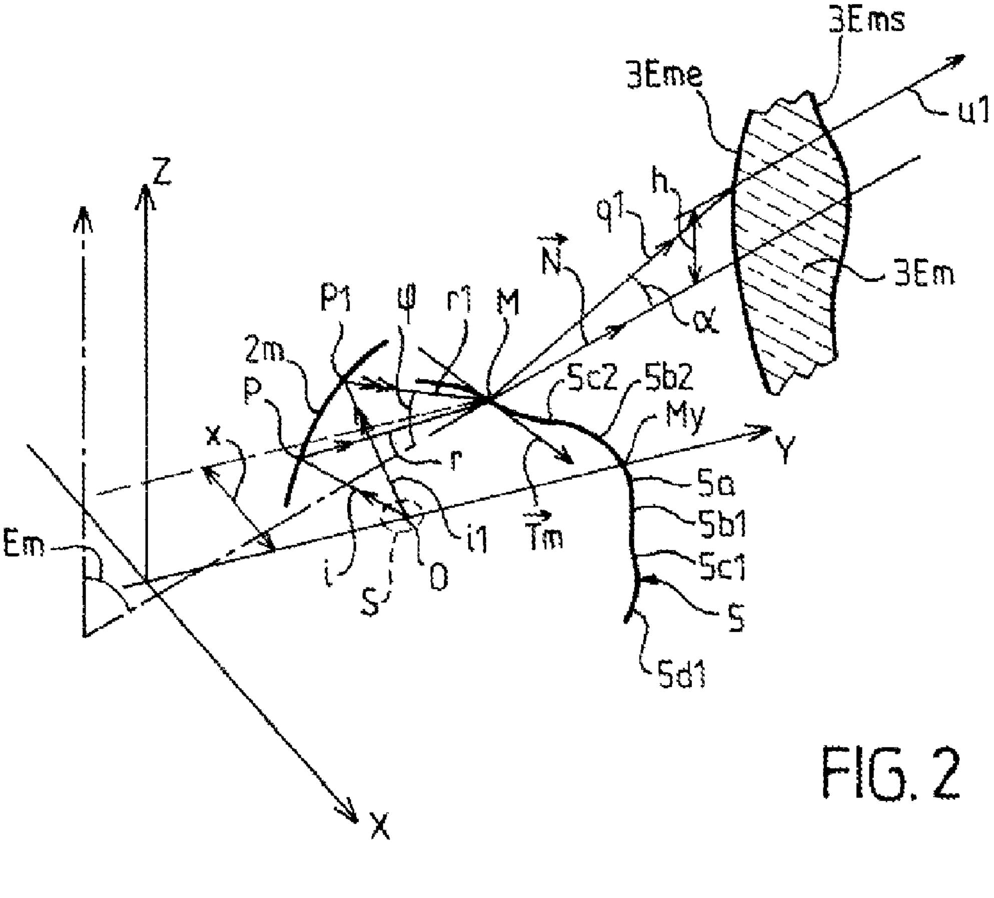
FIG. 2 is a diagram in perspective under another angle, with a cut or torn part, at larger scale, of a vertical section of the module according to the previous figure, representing luminous radii.

As visible on FIGS. 1, 2 and 4, in the central zone 5*a* of the edge the curve is constant on both sides of the optical axis; this part 5*a* corresponds to a circle arc of constant radius, centered on the optical axis Y. The ends of arc 5*a* connect, respectively, to an arc 5*b*1, 5*b*2 presenting a higher curve. The radius of curvature (inverse of the curvature) of arcs 5*b*1, 5*b*2 is smaller than that of the central part 5*a*.

A portion 5*c*1, 5*c*2 provides the connection between the ends of zones 5*b*1, 5*b*2 with strong curvature with end arcs 5*d*1, 5*d*2 which are forwardly convex, having a curvature below or equal to that of the central part 5*a*. The intermediary zones 5*c*1, 5*c*2, are of variable convexity in relation to the adjacent zones. All of these zones recede in relation to the circle of radius Ra as represented in FIG. 5.

The zones of strong curvature 5*b*1, 5*b*2 make it possible to spread the beam laterally and reinforce the brightness in the angular end zones, for example to ±35° on both sides of optical axis Y, by decreasing intensities in the intermediary zones, and without affecting the central part of the beam, the brightness of which especially depends on central zone 5*a* of the curve. In effect, the zone of the curve corresponding to the angles of lines 8 according to FIG. 6 detailed below (the zones 5*b*) are of small size, the angles evolve quickly according to x, due to the strong curvature, so that more room remains for zones 5*d*, where the angles are made to vary 'more slowly' according to x.

The central part of the beam generally corresponds to an angle of ±10° on both sides of the optical axis and the angular extent of the central part 5*a* of the bender is sufficient to ensure the desired intensity within the range ±10°.

It should be noted that if the front edge of the bender was formed by a circular arc centered on the optical axis, it would be possible by reducing the radius of this circular arc, and therefore increasing the curve over the whole of the edge, to improve the brightness of the angular end zones, but this improvement would be accompanied by a decrease in brightness in the central zone ±10° on both sides of the optical axis, which the invention makes it possible to avoid.

FIG. 4 represents the position of the centers of curvature for the different zones represented in FIG. 5. C is the circle of radius Ra. O is the center of curvature for zone 5*a* of radius Ra. O1 is the center of curvature for zone 5*d*2 of radius Rd. O2 is the center of curvature for the minimum point of radius of curvature (Rb), a point situated at the end of zone 5*b*2. When one runs zone 5*b*2 from zone 5*a* to zone 5*c*2, the center of curvature of the flat curve 5 shifts from O to O2. When one runs zone 5*c*2 from zone 5*b*2 to zone 5*d*2, the center of curvature shifts from O2 to O1.

FIG. 5 illustrates the variation of the radius of curvature R in a point of curve 5, according to its lateral distance, that is, its distance x to the optical axis, brought to x-axis. Radius R, brought to y-axis, corresponds to the inverse of the curvature. It appears that radius R passes through two minimum values Rb, on both sides of the optical axis, corresponding to the points of stronger curvature of parts 5*b*1, 5*b*2. The central part presents a radius of curvature Ra which is constant in the example considered, and the end parts a higher radius of curvature Rd which is likewise constant.

Reflector 2 is determined to transform a spherical wave surface originating from light source S into a wave surface leading to curve 5 of the edge of the bender.

Edge 5 of the bender is the solution of a differential equation involving the radius of curvature R(x) as stated hereafter, being a solution which can be found numerically by choosing an arbitrary point of edge 5. Preferably, as the position of source S is known, one takes the point My (FIG. 2) of the edge belonging to optical axis Y of the module, this being an axis that passes through the center of the source; this reduces the choice of the point of passage to that of a simple actual parameter, similar to the distance between focuses in an ellipsoid.

Thanks to classical numerical methods (for example Runge-Kutta) one can calculate with the desired accuracy (by means of the necessary calculation time) the position (x, f(x), 0) of a current point M (FIG. 2) of x-axis following the x-axis, of y-axis f(x) following the optical y-axis, and zero altitude following the vertical z-axis. One can also calculate tangent $\vec{T}$ at edge 5 at this point M, by establishing the directing carrier of component 1, f'(x), 0 of this tangent $\vec{T}$. One deducts from this the normal level Em at edge 5 at the point M considered. This normal level is a vertical level, the trace of which at the level of edge 5 is the normal $\vec{N}$ to edge 5 at point M.

Reflector 2 is determined by a family of curves 2*m*, each curve 2*m* corresponding to the intersection of the reflector with a normal level Em at edge 5 in a current point M. Each curve 2*m* is situated in a level Em. The family of curves 2*m* is obtained by shifting level Em perpendicularly to edge 5.

A curve 2*m* must present the following property. One considers luminous radii i, i1, coming from focus O, center of source S, and reaching reflector 2 in current points P, P1 belonging to level Em. Points P, P1 are situated on curve 2*m*, which is such that the radii i, i1 are reflected according to radii r, r1, directed towards point M of edge 5. The reflected radii r, r1 are therefore contained with in level Em.

This property, and the choice of an arbitrary point, for example point Py as intersection of the reflector and optical axis Y, entirely define reflector 2, curve 5 having been previously defined, by writing the constancy of the optical path of source S to edge 5 of the bender. The value of the optical path results from the choice of arbitrary points My and Py. The more detailed calculation is given hereafter in this description.

Reflector 2 can thus be calculated as a parametrical surface in x (rating of a point M on edge 5 of a bender, following the x-axis) and according to the angle ϕ, this angle being that formed between a radius such as r1, sent back by reflector 2 and falling on edge 5 at point M, and the level of the bender (see FIG. 2). The altitude of the bender is zero, z=0.

Lens 3 can be determined as follows. The section, or intersection, 3Em of lens 3 with the level Em defined above, corresponds to the cut of a stigmatic lens between point M of edge 5 of bender and the infinite, this level containing the axis of the stigmatic lens. This section 3Em is marked by two dioptres: an input dioptre 3Eme, and an output dioptre 3Ems. The material, glass or transparent plastic material, of section 3Em, is between these two dioptres.

One can arbitrarily choose one of the two dioptres of the lens. One generally chooses the input dioptre 3Eme. In the example of calculation given below, this input dioptre consists of a irrigate arc in level Em, backwardly convex, of center Ω (FIG. 3) situated in the level of bender 5. The output dioptre 3Ems is calculated so that a luminous radius u1, coming from lens 3 and originating from an incident radius q1 coming from point M, is parallel to the horizontal level of bender 5.

Lens 3 could have its parameters set as for the reflector, but a mesh en (x, h), h being the height of the points on the input side of the lens (see FIGS. 2 and 3), enables a more simple calculation. Lens 3 is not of revolution, particularly around a vertical axis.

FIG. 6 illustrates in diagram form the network of isolux curves obtained on a screen, generally at a distance of 25 m, with a module in accordance with the invention. The brightness in the central zone between −10° and +10° on both sides of the optical axis is not diminished in relation to a module, the bender of which would have a circular front edge with radius equal to the average radius of curvature of edge 5 according to the invention.

On the contrary, the zones situated at end −35° and +35° on both sides of the optical axis, and corresponding to lines recorded as 9-1 and 9-2 according to standard R19-3, present greater brightness than that of a module with bender to edge in a circular arc. The zones in which light was taken for transfer to lines 9-1 and 9-2 corresponds perceptibly to the intermediary lines 8-1 and 8-2 between the central zone and the end zones.

The invention thus allows an optimization, particularly by the choice of R(x) from which one deduces curve f(x) describing the front edge 5 of the bender, and offers greater flexibility. The optimization can result from comparative calculations made with different equations f(x) for curve 5.

It becomes possible to make a fog-lamp with a single module, while producing a beam that satisfies statutory requirements. A module according to the invention can also serve as a base module for low beam.

Examples of calculation follow in order to determine reflector 2 and lens 3, with reference to FIGS. 2 and 3.

Example of Calculation of Reflector 2

That is, R(x) the radius of curvature of the edge of bender in a point M, of x-axis x, situated on curve 5 of equation y=f(x).

The center of curvature at point M is in the level z=o. The radius of curvature R(x) is given by the following formula:

$$\frac{1}{R(x)} = \frac{-f''(x)}{(1+f'(x)^2)^{3/2}}$$

differential equation in f, with the following initial conditions at point My:

$$f(0)=Y_o$$

$$f'(0)=0$$

numerical soluble in the shape of:

$$Y' = F(x, Y), \text{ where } Y = \begin{bmatrix} f'(x) \\ f(x) \end{bmatrix} = \begin{bmatrix} Y_1 \\ Y_2 \end{bmatrix}$$

Vector tangent to point M:

$$\begin{bmatrix} 1 \\ f'(x) \\ 0 \end{bmatrix} = \overrightarrow{T_m}\quad F = \begin{cases} -\dfrac{(1+Y_1^2)^{3/2}}{R(x)} \\ Y_1 \end{cases}$$

Normal vector (in the direction of the center of curvature):

$$\frac{1}{\sqrt{1+f'(x)^2}}\begin{bmatrix} f'(x) \\ -1 \\ 0 \end{bmatrix} = \overrightarrow{n_m}$$

at point M

Supposing the source is placed in O:

For any x, and for any $\vec{v}$ orthogonal to $T_{\vec{m}}(x)$, there is a current point P of the reflector such that: PM(x)+PO=K=optical path with $\overrightarrow{M(x)P}$ jointly linear to $\vec{v}$ and $$M(x) = \begin{pmatrix} x \\ f(x) \\ 0 \end{pmatrix}$$

(current point of curve 5). K is an arbitrary constant.

$$P = M + \lambda\vec{v} \text{ where } \vec{v} = \cos\phi\,\vec{n}_m + \sin\phi\,\vec{z}$$

One draws the following from the optical equation:

$$OP = K - MP \Rightarrow OP^2 = K^2 + MP^2 - 2KMP$$
$$\Rightarrow OM^2 + \lambda^2 + 2\lambda\overrightarrow{OM}\cdot\vec{v} = K^2 + \lambda^2 - 2KMP$$
$$\Leftrightarrow 2\lambda\left(\overrightarrow{OM}\cdot\vec{v} + K\right) = K^2 - OM^2$$

When $K^2=OM^2$ one reaches a limit point for the calculation of the reflector.

Example of Calculation for Lens 3

That is, I (FIG. 3) a current point of altitude h of the input dioptre 3Eme, of radius of curvature Ri. That is, Q is the distance from point M of curve 5 to the point of the input dioptre situated in the horizontal level of curve 5.

The angle α designates the angle between MI and the horizontal. Ω designates the center of the circular arc forming the input dioptre 3Eme, Ω being situated in the level of the bender. The angle between ΩI and the horizontal is designated by β.

$$\sin\beta = \frac{h}{Ri}$$

$$tg\alpha = \frac{h \quad \}\ z_i}{Q + R_i - R_i\cos\beta \quad \}\ y_i}$$

with $n_L$=refraction index of the material of lens 3

| angle of incidence: α + β | | angle of refraction: ρ |
|---|---|---|
| | $n_L \sin\rho = \sin(\alpha+\beta)$ | |
| | $\gamma = \rho - \beta$ | |

by designating by μ the distance, in lens 3, between input point I of a radius and output point W on the output dioptre 3Ems, one obtains the following for coordinates of point W $$W\begin{bmatrix} y_i + \mu\cos\gamma \\ z_i + \mu\sin\gamma \end{bmatrix} = \begin{bmatrix} yw \\ zw \end{bmatrix}$$

That is, $e_L$ the thickness of lens 3 at the centre, one poses: $y_0=Q+e_L$ and $K1=Q+n_L e_L$ $$\text{Optical path} = \frac{h}{\sin\alpha} + n_L\mu + y_0 - y_w = \frac{h}{\sin\alpha} + (y_0 - y_i) + \mu(n_L - \cos\gamma) = K1$$

whence one draws μ(h), and therefore $y_i(h)$ and W(h)

Conjugated surfaces

Two points according to x and h

Input: $M - y_i\vec{n}_w + h\vec{z}$

Output: $M - y_w\vec{n}_w + z_w\vec{z}$

Figure 7:
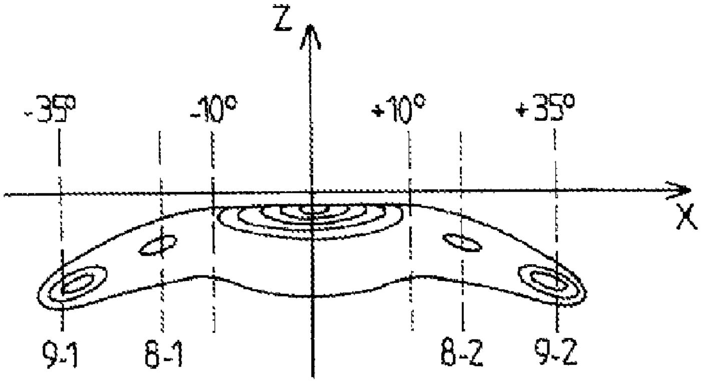
FIGS. 7 to 10 relate to a second variant of the invention.
Figure 8:
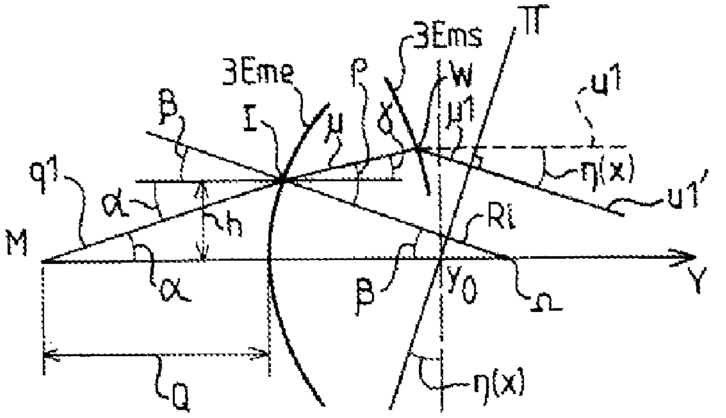
Figure 9:
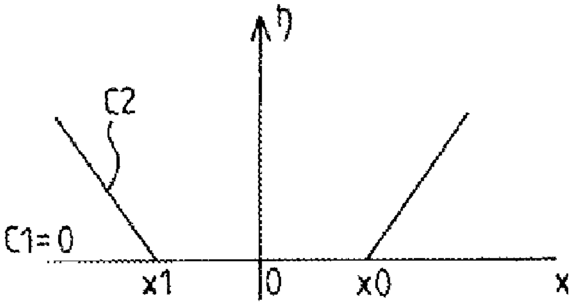

According to another variant of the invention, one tries to make a light beam with a ‘descending’ cut in its most lateral zones, as represented in FIG. 7. As explained in FIG. 9, which represents the evolution of the value of $\acute{\eta}(x)$ in accordance with x, one sees that one uses a function η(x) which is growing or constant in accordance with |x| (absolute value of x):

- According to curve C2, for $x \geqq x_0$ and for $x \leqq x_1$, where $x_o \geqq 0$, and $x_1 \leqq 0$, the normal levels at curve 5 in $x_o$ and $x_1$ make an angle of over 5°, preferably equal to or in excess of 10°, in relation to the optical axis. For x belonging to segment $[x_1\text{-}X_o]$, $\acute{\eta}(x)$ is zero.
- By comparison, the first variant of the invention, with the light beam according to FIG. 6, corresponds on this FIG. 7 to curve C1, where $\acute{\eta}(x)$ is constantly zero.

Figure 10:
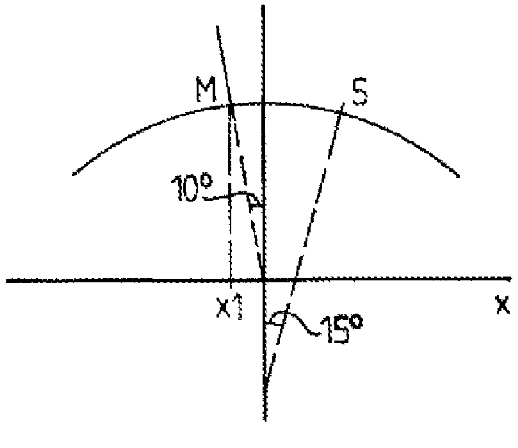

FIG. 10, which represents curve 5 seen from above, represents the trace of the normal level at points M of coordinates $x_1$ and $x_o$.

If $\acute{\eta}(x)$ remains weak (particularly below 3.5°), one improves the beam without compromising respect of the standards, particularly the one concerning fog-lamps. Here, the term ‘improves’ signifies the fact that one manages to increase the quantity of light close to the vehicle at high lateral angles, which is more useful to the driver than distant light.

What distinguishes this variant from the previous variant concerns the construction of the lens: in this variant, lens 3' can be determined as follows: The section, or intersection 3'Em of lens 3' with level Em defined above, corresponds to the section of a stigmatic lens between point M of edge 5 of the bender and the infinite, this level containing the axis of the stigmatic lens, inclined axis of an angle $\acute{\eta}$, continuous function of x, in relation to the projection of the optical axis of the module in the level considered. Here, the output dioptre 3Ems' is calculated so that the luminous radius u1', coming from lens 3' and originating from an incident radius q1 coming from point M, can make an angle $\acute{\eta}(x)$ with the horizontal level of bender 5.

The example of calculation for lens 3' presents the following modifications in relation to the example according to the first variant detailed above: as for the previous example, point I is a current point which is found in a level perpendicular to curve 5 passing by any point M' of the latter, of lateral coordinate x.

The optical path is modified as follows:

$$\text{Optical path} = \frac{h}{\sin\alpha} + n_L\mu + \mu_1 = \frac{h}{\sin\alpha} + (y_0 - y_i)\cos\acute{\eta} + h\sin\acute{\eta} + \mu(n_L - \cos\gamma\cos\acute{\eta} + \sin\gamma\sin\acute{\eta}) = K1$$

The inclined level of an angle $\acute{\eta}$ (x) in relation to the vertical and perpendicular to the level of the construction, the trace of which is the straight π, constitutes an output wave surface by the section of the lens considered. If one poses $\acute{\eta}$ (x)=0, one finds the example according to the previous variant.

To sum up, for this second variant, the lighting module is such that, for any level perpendicular to the edge of bender 5 in a point M, the intersection of lens 3 with the level is the section of a stigmatic lens between point M and the infinite, the direction of the radii emerge by making an angle $\acute{\eta}$ with the level of the bender, an angle with continuous function of the lateral coordinate (x) this point M.

Preferably, the function $\acute{\eta}$(x) is constant or growing in accordance with the lateral coordinate (x) of point M.

And, particularly the function $\acute{\eta}$(x) is constant and zero between the lateral coordinates of the points of the edges of the bender situated on both sides of a vertical level containing optical axis (Y) of the module, preferably with the angle of the normal levels at the edge of the bender passing by these points with the axis (Y) that is, equal to or in excess of to 5°, particularly equal to or in excess of 10°.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A lighting module for a motor vehicle headlight, giving a cut light beam, comprising:

a concave reflector;

at least one light source (S) arranged in a concavity of said concave reflector;

a lens situated in front of said concave reflector and said at least one light source (S); and a bender that is generally planar and has a top side that is reflecting to bend the beam originating from said concave reflector, said bender having a front edge at a front end thereof to form said cut light beam, said front edge of said bender having a variable curvature that is a function of a lateral coordinate (x) relative to a point (M) and defines a serpentine or variable curvature, wherein said serpentine or variable curvature has a curved central zone that is generally convex toward said lens but comprises at least one adjacent curvature adjacent said central zone that has a curvature that is concave relative to said lens so that a brightness of said beam between approximately −10° and +10° of said optical axis is similar to a brightness of said beam along said optical axis and not diminished in comparison to a comparative bender having a comparative bender edge having a continuous arc.

2. The lighting module according to claim 1, wherein a maximum curvature of said front edge of said bender is chosen so that a brightness of angular end zones of the beam from a first end arc and a second end arc is reinforced, without decreasing the brightness of the central zone.

3. The lighting module according to claim 1, wherein angular end zones of the cut light beam from a said first end arc and a second end arc extend according to directions equal to or in excess of ±35° on both sides of an optical axis.

4. The lighting module according to claim 1, wherein for any level perpendicular to said front edge of said bender at point(M), an intersection of lens with said level is a section of a stigmatic lens with an emerging direction of the radii making an angle η with said level of said bender, wherein angle η is continuous function of the lateral coordinate (x) of the said point (M).

5. The lighting module according to claim 4, wherein said function η(x) is constant or growing in accordance with the absolute value of lateral coordinate (x) of point M.

6. The lighting module according to claim 4, wherein said function η(x) is constant and zero between lateral coordinates of a plurality of points along said front edge of said bender, said plurality of points being situated on both sides of an optical axis (Y) of the lighting module, preferably with an angle of normal levels at said front edge of said bender passing by these points with the said optical axis (Y) that is, equal to or in excess of 5°, particularly equal to or in excess of 10°.

7. The lighting module according to claim 1, wherein a reflector surface of said concave reflector is such that the luminous radii (i,i1) coming from said at least one source and falling in points (P, P1) situated on the intersection (2m) of said reflector surface and a vertical level (Em) passing through said center of curvature, but away from said at least one source, are reflected in said vertical level so as to converge in said point (M) situated at the intersection of said vertical level and said front edge of said bender.

8. The lighting module according to claim 1, wherein a brightness in said curved central zone between −10° and +10° on both sides of the optical axis is maintained in relation to a base module having a base module bender having a circular front edge of radius equal to the average radius of curvature of said front edge, while the zones situated at about −35° and +35° on both sides of an optical axis, present a brightness higher than that obtained with said base module.

9. The lighting module according to claim 1, wherein said cut beam obtained is of flat cut, being particularly chosen between a fog beam and a portion of low beam of flat cut.

10. A motor vehicle headlight, wherein said motor vehicle headlight includes at least one module according to claim 1.

11. The lighting module according to claim 1, wherein said curved central zone is a substantially constant central zone radius of curvature that is generally centered on an optical axis of the lighting module;

wherein said front edge further comprises a first adjacent curvature and a second adjacent curvature adjacent said curved central zone, said first and second adjacent curvatures each having generally the same radius of curvature that is smaller than said curved central zone radius of curvature, said first and second adjacent curvatures having an inverse orientation compared to said curved central zone.

12. The lighting module according to claim 11, wherein said lens is determined to give an image from said point (M) of said front edge of said bender in a direction which is inclined in relation to said bender, with an angle of continuous function of the distance from said point (M) to said optical axis.

13. The lighting module according to claim 11, wherein the curvature of said front edge of said adjacent curvature of said bender is defined by a curvature having at least one maximum situated at an angle between optical axis (Y) of the lighting module and an angular limit of the beam from said at least one light source.

14. The lighting module according to claim 11, wherein said curved central zone of said front edge of said bender has a secondary maximum situated on or substantially on said optical axis.

15. The lighting module according to claim 13, wherein said curvature of said front edge of said bender is defined by a curvature having a maximum on each side of said optical axis.

16. The lighting module according to claim 15, wherein said front edge of said bender is symmetrical in relation to said optical axis.

17. The lighting module according to claim 11, wherein said front edge further comprises a third curvature between said first adjacent curvature and a first end arc and a fourth curvature between said second adjacent curvature and a second end arc, said first and second end arcs having an end arc radius of curvature that is less than or equal to said central zone radius of curvature of said curved central zone and being curved in the same direction as said curved central zone.

18. The lighting module according to claim 17, wherein said front edge further comprises a third curvature between said first adjacent curvature and a first end arc and a fourth curvature between said second adjacent curvature and a second end arc, said first and second end arcs having an end arc radius of curvature that is less than or equal to said central zone radius of curvature of said curved central zone and being curved in the same direction as said curved central zone.

* * * * *